US012608167B1

(12) United States Patent
Chigullapalli et al.

(10) Patent No.: US 12,608,167 B1
(45) Date of Patent: Apr. 21, 2026

(54) INDICATOR OF COOLING SYSTEM SUITABILITY

(71) Applicant: AMD Design, LLC, Wilmington, DE (US)

(72) Inventors: Sruti Chigullapalli, Secaucus, NJ (US); Shoaib Ahmed, Secaucus, NJ (US); Pruthvik Raghupathi, Secaucus, NJ (US)

(73) Assignee: AMD Design, LLC, Wilmington, DE (US)

( * ) Notice: Subject to any disclaimer, the term of this patent is extended or adjusted under 35 U.S.C. 154(b) by 94 days.

(21) Appl. No.: 18/616,475

(22) Filed: Mar. 26, 2024

(51) Int. Cl.
*G06F 3/14* (2006.01)
*G06F 1/20* (2006.01)

(52) U.S. Cl.
CPC ................ *G06F 3/14* (2013.01); *G06F 1/206* (2013.01)

(58) Field of Classification Search
CPC .................................. G06F 3/14; G06F 1/206
USPC ........................................................ 340/815.4
See application file for complete search history.

(56) References Cited

U.S. PATENT DOCUMENTS

| | | | | |
|---|---|---|---|---|
| 10,481,651 | B2 * | 11/2019 | Dede ......................... | G06F 1/26 |
| 2018/0137719 | A1 * | 5/2018 | Kuscher ............... | G06F 1/1616 |
| 2018/0192552 | A1 * | 7/2018 | Tan .................... | H05K 7/20736 |
| 2022/0142006 | A1 * | 5/2022 | Heydari ............ | H05K 7/20154 |
| | | | | 361/694 |
| 2024/0184961 | A1 * | 6/2024 | VanGilder .............. | G06F 30/28 |

\* cited by examiner

*Primary Examiner* — Omar Casillashernandez
(74) *Attorney, Agent, or Firm* — Dergosits & Noah LLP; Todd A. Noah

(57) ABSTRACT

Method and system provide visual means to assess the suitability of using a potential system with a target system. The data regarding the target system and one or more potential systems to be used with the target system may be displayed. For each potential system, and for each of one or more criteria regarding the potential system, a suitability level is determined may be represented on a display with a visual indicator, e.g., green, yellow, or red. Thus, the display provides a visual indication of the suitability of the potential systems across the range of criteria.

18 Claims, 10 Drawing Sheets

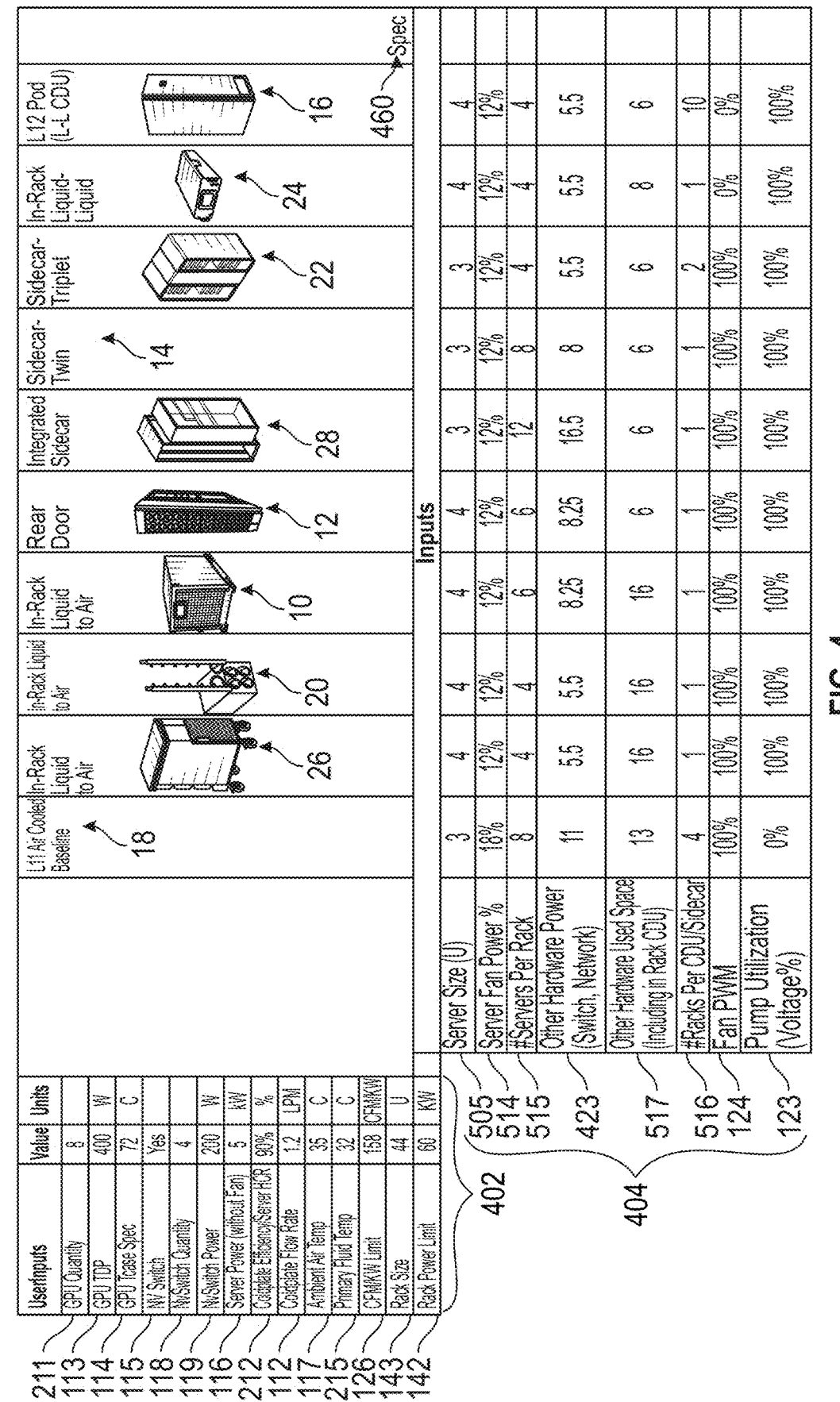

400

402 — User Inputs

| Ref | User Inputs | Value | Units |
|---|---|---|---|
| 211 | GPU Quantity | 8 | |
| 113 | GPU TDP | 400 | W |
| 114 | GPU Tcase Spec | 72 | C |
| 115 | NV Switch | Yes | |
| 118 | NvSwitch Quantity | 4 | |
| 119 | NvSwitch Power | 200 | W |
| 116 | Server Power (without Fan) | 5 | KW |
| 212 | Coldplate Efficiency/Server HCR | 90% | % |
| 112 | Coldplate Flow Rate | 1.2 | LPM |
| 117 | Ambient Air Temp | 35 | C |
| 215 | Primary Fluid Temp | 32 | C |
| 126 | CFM/KW Limit | 158 | CFM/KW |
| 143 | Rack Size | 44 | U |
| 142 | Rack Power Limit | 60 | KW |

404 — Inputs    (460 → Spec)

| Ref | Inputs | L11 Air Cooled Baseline (18) | In-Rack Liquid to Air (26) | In-Rack Liquid to Air (20) | In-Rack Liquid to Air (10) | Rear Door (12) | Integrated Sidecar (28) | Sidecar-Twin (14) | Sidecar-Triplet (22) | In-Rack Liquid-Liquid (24) | L12 Pod (L-L CDU) (16) |
|---|---|---|---|---|---|---|---|---|---|---|---|
| 505 | Server Size (U) | 3 | 4 | 4 | 4 | 4 | 3 | 3 | 3 | 4 | 4 |
| 514 | Server Fan Power % | 18% | 12% | 12% | 12% | 12% | 12% | 12% | 12% | 12% | 12% |
| 515 | #Servers Per Rack | 8 | 4 | 4 | 6 | 6 | 12 | 8 | 4 | 4 | 4 |
| 423 | Other Hardware Power (Switch, Network) | 11 | 5.5 | 5.5 | 8.25 | 8.25 | 16.5 | 8 | 5.5 | 5.5 | 5.5 |
| 517 | Other Hardware Used Space (Including in Rack CDU) | 13 | 16 | 16 | 16 | 6 | 6 | 6 | 6 | 8 | 6 |
| 516 | #Racks Per CDU/Sidecar | 4 | 1 | 1 | 1 | 1 | 1 | 1 | 2 | 1 | 10 |
| 124 | Fan PWM | 100% | 100% | 100% | 100% | 100% | 100% | 100% | 100% | 0% | 0% |
| 123 | Pump Utilization (Voltage%) | 0% | 100% | 100% | 100% | 100% | 100% | 100% | 100% | 100% | 100% |

FIG. 4

406 (Columns labeled 148a; risk/assessment section)

| Ref | Parameter | | | | | | | | | | |
|---|---|---|---|---|---|---|---|---|---|---|---|
| | | Low Risk | Low Risk | Low Risk | High Risk | Low Risk | Low Risk | Low Risk | Low Risk | Low Risk | Low Risk |
| 134 | Server Airflow Assessment | | | | | | | | | | |
| 135 | Loop Temp Assessment | NA | Pass | Fail | Fail | Fail | Pass | Pass | Pass | Pass | Pass / 65 |
| 137 | Server Liquid Inlet Temp | NA | Pass | Fail | Fail | Fail | Pass | Pass | Pass | Pass | Pass |
| 131 | GPU T(caes)function Assessment | Pass | Pass | Pass | Pass | Pass | Pass | Pass | Pass | Pass | Pass |
| 133 | Rack Space Assessment | Pass | Pass | Pass | Pass | Pass | Pass | Pass | Pass | Pass | Pass |
| 132 | Rack Power Assessment | Pass | Pass | Pass | Fail | Pass | Pass | Pass | Pass | Pass | Pass |

408 — L10 and L11 Analysis (148c)

| Ref | Parameter | | | | | | | | | |
|---|---|---|---|---|---|---|---|---|---|---|
| 424 | L10 Heat into Liquid (Per Server) kW | NA | 3.6 | 3.6 | 3.6 | 3.6 | 3.6 | 3.6 | 3.6 | 3.6 |
| 425 | L10 Heat into Air (kW) | 6.10 | 2.08 | 2.08 | 2.08 | 2.08 | 2.08 | 2.08 | 2.08 | 2.08 |
| 422 | L10 Server Power (kW) | 6.10 | 5.68 | 5.68 | 5.68 | 5.68 | 5.68 | 5.68 | 5.68 | 5.68 |
| 426 | Fan Power (kW) | 1.10 | 0.68 | 0.68 | 0.68 | 0.68 | 0.68 | 0.68 | 0.68 | 0.68 |
| 427 | L10 Liquid Heat Capture Rate (%) | NA | 63% | 63% | 63% | 63% | 63% | 63% | 63% | 63% |
| 311 | Rack Power (kW) | 59.8 | 28.2 | 42.3 | 42.3 | 84.7 | 53.5 | 28.2 | 28.2 | 28.2 |
| 428 | L11 Liquid Heat Capture Rate (%) | NA | 51% | 51% | 51% | 55% | 54% | 51% | 51% | 51% |

410 — L12 Analysis

| Ref | Parameter | | | | | | | | | |
|---|---|---|---|---|---|---|---|---|---|---|
| 220 | Heat Load into HEX (kW) | NA | 14.4 | 21.6 | 21.6 | 43.2 | 28.8 | 28.8 | 14.4 | 144.0 |
| 430 | CDU Fan Power (kW) | 0.00 | 1.92 | 1.92 | 4.85 | 2.25 | 2.70 | 2.70 | 0.00 | 0.00 |
| 459 | Pump Power (kW) | 0.00 | 0.64 | 0.64 | 0.51 | 0.69 | 1.37 | 1.37 | 0.63 | 7.00 |
| 431 | CDU Power (kW) | 0.0 | 2.6 | 2.6 | 5.4 | 2.9 | 4.1 | 4.1 | 0.6 | 7.0 |

FIG. 4
(Continued)

| Ref | Parameter | | | | | | | | | | | |
|---|---|---|---|---|---|---|---|---|---|---|---|---|
| 432 | Total Electrical Power (Rack+CDU) (kW) | 239.1 | 32.3 | 30.8 | 44.9 | 47.7 | 87.6 | 57.5 | 60.5 | 28.9 | 289.3 | |
| 433 / 434 | Effective Electrical Power (kW) (Normalized Per Server) | 7.5 | 8.1 | 7.7 | 7.5 | 7.9 | 7.3 | 7.2 | 7.6 | 7.2 | 7.2 | |
| 308 | L12 Airflow Available (CFM) | 37781 | 5108 | 4865 | 7095 | 7536 | 13843 | 9088 | 9562 | 4559 | 45705 | |
| 435 | CDU/Sidecar Airflow (CFM) | 0 | 3881 | 3395 | 3395 | 7193 | 4995 | 6593 | 6593 | 0 | 0 | |
| | Airflow Available Per Rack (CFM) | 9445 | 1227 | 1470 | 3700 | 343 | 8848 | 2495 | 1484 | 4559 | 4571 | |
| 144 / 112 | Airflow Available Per Server (CFM) | 1181 | 307 | 367 | 617 | 57 | 737 | 312 | 371 | 1140 | 1143 | |
| 436 | Server cfm/kW (Available) | 194 | 147 | 176 | 296 | 27 | 354 | 150 | 178 | 311 | 312 | 158 |
| 437 | Coldplate Rca/Rcj (C/W) | 0.060 | 0.020 | 0.020 | 0.020 | 0.020 | 0.020 | 0.010 | 0.010 | 0.020 | 0.020 | |
| 438 | Coldplate Rja/Rj (C/W) | 0.12 | 0.040 | 0.031 | 0.031 | 0.031 | 0.031 | 0.031 | 0.031 | 0.031 | 0.031 | |
| | Effective CDU Resistance (GPU Power normalized) (C/W) | | 0.019 | 0.025 | 0.068 | 0.016 | 0.028 | 0.015 | 0.015 | 0.0013 | 0.0054 | |
| 230 / 240 | CDU/Sidecar DT/kW (C/kW) | N/A | 0.520 | 0.700 | 1.250 | 0.300 | 0.260 | 0.210 | 0.210 | 0.037 | 0.015 | |
| 145 | Approach Temp (C) | N/A | 7 | 10 | 27 | 6 | 11 | 6 | 6 | 1 | 2 | 12 |
| | Liquid Temp Into Server (C) | N/A | 42 | 45 | 62 | 47 | 46 | 41 | 41 | 33 | 34 | 47 |

| | | | | | | | | | | | |
|---|---|---|---|---|---|---|---|---|---|---|---|
| 146 | Liquid Temp Out of Server(C) | N/A | 48 | 51 | 68 | 53 | 52 | 47 | 47 | 38 | 40 | 65 |
| 439 | Liquid Flow Rate (LPM)* | N/A | 38.4 | 38.4 | 57.6 | 57.6 | 115.2 | 76.8 | 76.8 | 38.4 | 384.0 | |
| 401 | Max Pump Capacity (LPM)* | N/A | 45 | 45 | 45 | 45 | 90 | 90 | 90 | 135 | 1900 | |
| 440 | Flow Rate/Liquid Heat Load (LPM/kW) | N/A | 2.7 | 2.7 | 2.7 | 2.7 | 2.7 | 2.7 | 2.7 | 2.7 | 2.7 | 1.5 |
| 114 | $T_{case}$ (C) | 59.0 | 50.5 | 53.1 | 70.0 | 54.9 | 54.2 | 45.1 | 45.1 | 40.5 | 42.2 | 72 |
| 301 | PUE | 1.17 | 1.27 | 1.21 | 1.17 | 1.25 | 1.15 | 1.20 | 1.19 | 1.13 | 1.13 | |
| 441 | Total Cost of Ownership (TCO) | | | | | | | | | | | |
| 442 | Total Cooling Power | | | | | | | | | | | |
| 443 | (Sever Fan+CDU Fan CDU Pump) (kw) | 35.12 | 6.83 | 5.29 | 6.65 | 9.45 | 11.11 | 9.52 | 9.52 | 3.35 | 34.27 | |
| 444 | Power Utilization for Cooling (%) | 14.7% | 21.1% | 17.2% | 14.8% | 19.8% | 12.7% | 16.6% | 15.7% | 11.6% | 11.8% | |
| 445 | Sever Air Cooling Cost (w/cfm) | 0.93 | 0.53 | 0.56 | 0.58 | 0.54 | 0.59 | 0.60 | 0.57 | 0.60 | 0.60 | |
| 446 | Liquid Cooling Cost (w/LPM) | N/A | 106.8 | 66.7 | 44.5 | 93.0 | 25.5 | 53.0 | 53.0 | 16.3 | 18.2 | |

Total Cost of Ownership (TCO)

| | | | | | | | | |
|---|---|---|---|---|---|---|---|---|
| 447 — Total Number of Servers Per Cluster | | | | | | 100 | 100 | 100 |
| 448 — Cost of L10 Equipment (Coldplates, Internal Manifold, Fans & Heat Sinks) | | | | | | $5,000 | $5,000 | $5,000 |
| 449 — L11 Equipment Cost (Rack Manifold Cost) | | | | | | $2,000 | $2,000 | $2,000 |
| 450 — CDU (Capital Cost + 451 — Installation & Commissioning) | | | | | | $50,000 | $40,000 | $80,000 |
| 452 — Cost Per kWh | | | | | | $0.20 | $0.20 | $0.20 |
| 453 — Servicing Cost Per Rack | | | | | | $2,000 | $1,000 | $1,000 |
| 454 — CDUs Required | | | | | | 13 | 25 | 3 |
| 126 — Total Cluster Level Capital Cost | | | | | | $1,175,000 | $1,550,000 | $750,000 |
| 455 — Number of Racks | | | | | | 25 | 25 | 25 |
| 456 — Total Cooling Power Per Rack | 8.78 | 6.83 | 5.29 | 6.65 | 9.45 | 11.11 | 9.52 | 4.76 | 3.35 | 3.43 |
| 457 — Cost Per Year | | | | | | $208,520 | $146,830 | $150,115 |
| 457 — Total Servicing Cost | | | | | | $50,000 | $25,000 | $25,000 |
| 458 — Total Operating Cost Per Year | | | | | | $258,520 | $171,830 | $175,115 |

INDICATOR OF COOLING SYSTEM SUITABILITY

BACKGROUND

High power GPUs/CPUs for AI and machine learning servers often demand liquid cooling. However, not all hyper-scale data centers are equipped to receive them. Some centers would prefer to continue to deploy liquid cooled racks in an air-cooled data center using in-rack/rear-door liquid-to-air sidecars. Other centers would prefer to plumb for an in-rack/end of row liquid-to-liquid coolant distribution unit (CDU). Then other centers prefer to achieve power savings and acoustics savings by converting air-cooled servers to liquid-cooled servers.

This illustrates that there is no consensus on the best solution: one size may not fit all. However, determining the suitability of any particular solution involves accounting for many variables, such as thermal limitations, power savings, acoustic limits, space constraints, and total cost of owner-ship (TCO). Hence, comparing solutions is, by itself, a burden. Thus, what is needed is an unbiased method for comparing solutions.

BRIEF DESCRIPTION OF THE DRAWINGS

The embodiments are illustrated by way of example and not limitation in the figures of the accompanying drawings, in which like references indicate similar elements, and in which:

FIG. 4 is a screenshot of a display showing results of a method for estimating cooling system suitability;

DETAILED DESCRIPTION

Embodiments provide an analysis system that receives data regarding the base system, e.g., the rack server system, and data regarding each potential system to be used with the target system, e.g., the potential cooling systems. For each of one or more criteria, the analysis system may determine an estimate indicative of the performance of the potential system with regard to the criteria. The analysis system then determines where that estimate falls within ranges of accept-ability, e.g., pass/fail, high risk/medium risk low risk, etc. The analysis system may then display, for each potential system, the criteria results, which may be color coded to facilitate the user's determining which of the potential systems fulfills the criteria. Thus, an embodiment provides a method for visually assessing the potential performance of a potential cooling system, a task that requires processing a daunting amount of data. In addition, an embodiment pro-vides a method for comparing multiple solutions by provid-ing a visually assessment of the potential performance of each of the potential cooling solutions at the same time, a task that is a multiple of the difficulty requires to assess a single cooling solution.

In an embodiment, a baseline may be developed using a first potential solution and additional potential solutions may be compared to the baseline. In an embodiment, the first potential solution may be an air-cooled solution because it is common for customers to be most familiar with air-cooled solutions, with additional potential solutions being any type of solution, such as air-cooled or liquid-cooled solutions. These potential solutions may be evaluated by the system in regard to how each potential solution would perform with regard to one or more criteria in cooling a base system, such as a rack server system. Thus, the embodiment would provide an apples-to-apples comparison of the several potential solutions.

Embodiments may provide one or more of the following features: the ability to simultaneously study the ability of several potential systems to address the base system needs; the replacing of ad hoc estimates of potential systems with a consistent evaluation model; the gathering of data regard-ing several potential systems into a single analytical tool and display.

Embodiments may be executed using, e.g., Excel and/or Python, and may be adapted to accept a variety of input data so that different types of potential solutions may be studied simultaneously. Furthermore, in the description below, the base system and the potential systems are exemplary, e.g., the base system may be a server rack system and the potential systems may be cooling systems to be used with the server rack system. Embodiments may, however, be adapted for use in comparing other base systems and other potential systems.

Figure 1:
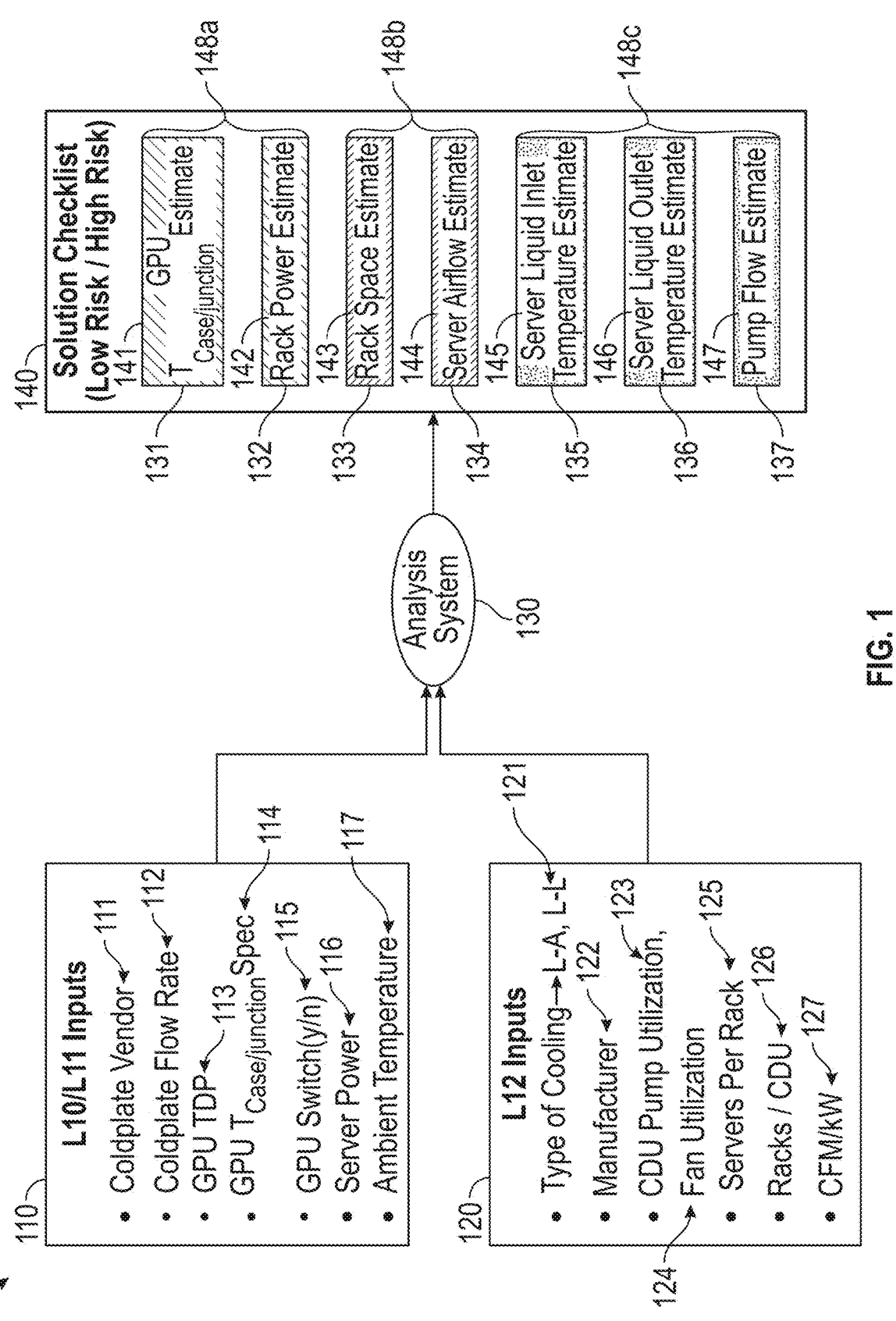
FIG. 1 is a flowchart illustrating an embodiment of a method for estimating cooling system suitability.

FIG. 1 is a flowchart illustrating an embodiment of method 100 for estimating the suitability of a variety of cooling systems for cooling a rack server system. In FIG. 1, L10/L11 inputs 110 and L12 inputs 120 are details or specifications regarding a potential cooling solution and are received by an analysis system (with optional display) 130, which provides an assessment 140 of the potential cooling system. L10 inputs generally describe the granular elements of the base system, e.g., the system to be cooled, such as: an ambient inlet air temp (° C. or ° F.), a GPU Thermal Design Power (TDP) (W), a number of GPUs in server, a presence y/n of a GPU switch, a GPU switch power (W), a flow rate per coldplate (LPM or GPM) and a cold liquid inlet tem-perature (C or F). L11 inputs generally describe the global elements of the base system, e.g., a rack size (in U), a rack power limit (kW), an inlet liquid temp (° C. or ° F.), air cooling and liquid cooling efficiency metrics (CFM/KW and LPM/KW) limits, a server size, a number of servers per rack, a number of racks per CDU, a cooling system operating point, a pump per fan utilization, etc. L12 inputs 120 generally describe the potential system addition, e.g., the solution cooling system being assessed.

In FIG. 1, L10/11 inputs include: a vendor/client 111, a cold plate flow rate 112, a GPU thermal design power (W) 113 ("GPU TDP 113"), a GPU $T_{case}$ or $T_{junction}$ specification 114 ("GPU $T_{case/junction}$ spec 114"), a presence y/n of GPU switches 115, a server power 116, and an ambient air temperature 117. A set of L12 inputs 120 are provided for each potential system addition. L12 inputs 120 may include: a type of cooling (liquid to air, liquid to liquid) 121; a manufacturer 122; a CDU pump utilization % specification 123; a fan utilization specification 124; a servers per rack specification 125; a racks per CDU specification 126; and a server airflow (CFM/kW) specification 127.

In an embodiment, an entry of a type of cooling 121 may cause different other L12 inputs 120 to become "necessary" inputs, which may require populating with an appropriate value for the system to proceed.

After receiving inputs 110, 120, analysis system 130 processes the data and provides, for each potential system addition, an assessment 140. While assessment 140 may include a single overall assessment of suitability, e.g., pass/fail or high/medium/low risk, in an embodiment, assessment 140 may include a plurality of assessments, each for a different criteria or category, e.g., assessments 131 . . . 137 in which: assessment 131 concerns a GPU junction or case temperature criteria; assessment 132 concerns a rack power criteria; assessment 133 concerns a rack space criteria; assessment 134 concerns a server airflow (CFM/KW) criteria; assessment 135 concerns a server liquid inlet temperature criteria; assessment 136 concerns a server liquid outlet temperature criteria; and assessment 137 concerns a pump flow criteria.

For each criterion in assessment 140, analysis system 130 may compare the assessment value—the estimate—to a specification value-a specification, limit, or target—for that category and indicates the degree to which the criterion is met by changing the appearance of a section of a display screen associated with the criterion. Thus, in assessment 140: a cross-hatch 148*a* indicates an assessment that the potential system addition passes the criteria or is otherwise low risk; a cross-hatch 148*b* indicates an assessment that the potential system addition is a medium risk; and a cross-hatch 148*c* indicates an assessment that the potential system addition fails the criteria or is otherwise high risk passes. In other words, the assessment in each category is an analysis of how well the estimate compares to the criteria, with the display indicating whether the estimate indicates the potential solution is a low, medium, or high risk with regard to that particular criterion. In some embodiments, colors, e.g., green, yellow, and red, may be used to convey the same assessments, respectively. In some embodiments, aspects of the display of each assessment may be dynamic to draw attention to the assessment, e.g., the indicator may move, e.g., vibrate or wiggle, a brightness or shape of the indicator may change, the color and/or cross-hatch may change or flash on/off, the size of an assessment field or image associated with a system may change, e.g., become larger when a system compares well to one or more criteria and/or become smaller when a system compares poorly to one or more criteria. Thus, in FIG. 1, assessment 140 provides an instant visual indication that, for the potential system addition, a GPU $T_{case/junction}$ estimate 141 results in an assessment 131 and a rack power estimate 142 results in an assessment 132 that the solution is "low risk" for those criteria; a rack space estimate 143 results in an assessment 133 and a server airflow (CFM/KW) estimate 144 result in an assessment 134 that the solution is "medium risk" for those criteria; and a server liquid inlet temperature estimate 145 results in an assessment 135, a server liquid outlet temperature estimate 146 results in an assessment 136, and a pump flow estimate 147 result in an assessment 137 that the solution is "high risk" for those criteria.

Assessment 140 illustrates that pass/fail criteria may be based on a number of individual criteria, e.g., not only based on GPU $T_{case/junction}$ estimate 141, but also on rack power estimate 142, rack space estimate 143, maximum coolant temperature estimate 146, server airflow (CFM/kW) estimate 144, and pump flow (LPM) estimate 147. This illustrates that, in some cases, rack space estimate 143 may be the limiting factor, in some cases rack power estimate 142 may be limiting, and in other cases server airflow (CFM/KW) estimate 144 or pump flow estimate 147 may be a limiting factor. This information regarding what is limiting is intended to assist a user in identifying the solution best suited for a project.

In an embodiment, the values of estimates 141 . . . 147 may be displayed within the space for the associated assessment 131 . . . 133 along with the visual indication of the assessment. In an embodiment, assessments 131 . . . 133 may include only the visual indication of the assessment.

In an embodiment, L11 inputs may be described as hyperscale specific boundary conditions independent of silicon vendor. In an embodiment, many such boundary conditions may be considered limits to which the corresponding estimates are compared. User inputs L11 may include: an ambient inlet air temperature 117 (FIG. 2), a number of GPUs per server 211, the presence y/n of GPU switches 115. Being independent of any particular silicon vendor, L11 inputs may be used by analysis system 130 in analyses that are applicable to all GPUs such as NVIDIA, AMD, Intel, AWS, Graphcore, etc. L11 hyperscale boundary conditions may further include: a primary fluid temperature 215 (FIG. 2), server airflow (CFM/KW) specification 127, a pump flow specification 439 (FIG. 4), a rack power specification (kW) 311 (FIG. 4), and a pump flow per liquid heat load specification (LPM/KW) 440 (FIG. 4).

In FIG. 1, L10/L11 inputs 110 and L12 inputs 120 are exemplary. In embodiments, analysis system 130 may develop an assessment, e.g., assessment 131, using any or all of L10/L11 inputs 110, any or all of L12 inputs, or any number of completely different inputs, e.g., such as data or specifications referenced elsewhere in this discussion.

Figure 2:
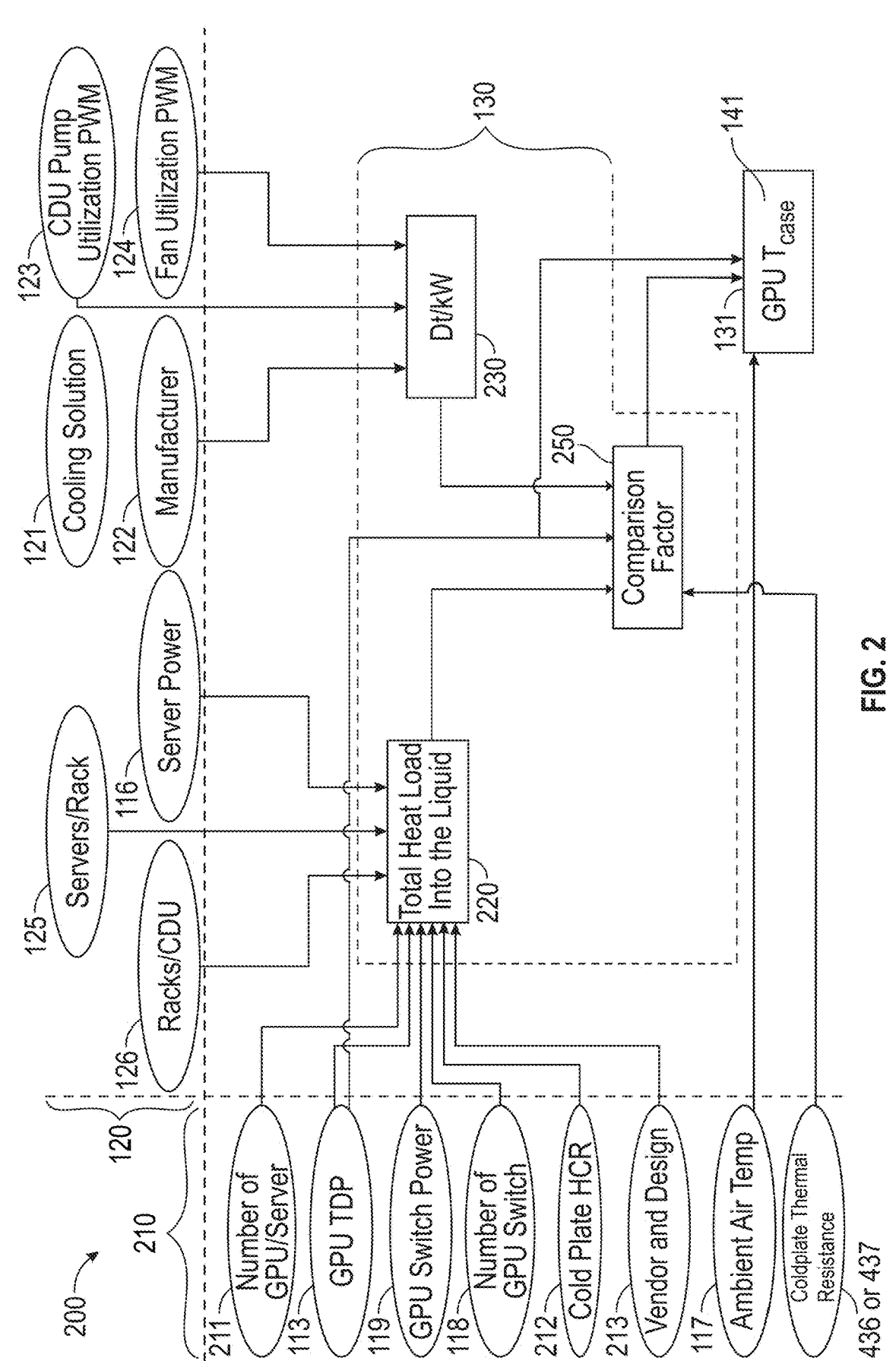
FIG. 2 is a flowchart illustrating an embodiment of a method for estimating cooling system suitability.

FIG. 2 is a flowchart illustrating an embodiment of method 200 for estimating the suitability of a potential system addition, e.g., a cooling system. Method 200, while shown to specifically result in assessment 131 concerning GPU $T_{case/junction}$ estimate 141, should be understood to provide a general method for obtaining data, e.g., L10/L11 user inputs and L12 potential system inputs, and analyzing that data to provide an assessment, e.g., any or all of assessments 140 or 131 . . . 137 of a potential system.

In FIG. 2, inputs 210 include a mix of L10/L11 user inputs 110. L10 inputs include: a number of GPUs per server 211, a cold plate heat capture rate (HCR) 212 also known as coldplate efficiency, a cold plate vendor and design 213, GPU TDP 113, and the presence y/n of GPU switches 115. An L10 input of server power 116 is shown within the row including L12 inputs 120. L11 user inputs include an ambient air temperature 117. L12 inputs 120 include: cooling solution type 121; manufacturer 122; CDU pump utilization (% PWM) spec 123; fan utilization (% PWM) 124; servers per rack 125; and racks per CDU 126. The computational engine of analysis system 130 receives the inputs and computes a total heat load into the liquid 220 using: number of GPUs per server 211, cold plate HCR 212, GPU TDP 113, a number of GPU switches 118, a GPU switch power 119, server power 116, servers per rack 125, and racks per CDU 126. The equations that provide estimates 141 . . . 146 are presented within. The efficiency of the cooling solution is provided by the change in temperature per kilowatt (Dt/kW) 230 metric which may be experimentally determined for each cooling solution type (see Equation 22). In other words, DT/KW 230 is data received or otherwise generated regarding each potential cooling system and is a function of: cooling solution type 121, manufacturer 122, CDU pump utilization (% PWM) spec 123, and fan utilization (% PWM) 124. Total heat load into liquid 220 is the heat load produced by the base system that the target cooling system (CDU) will need to be able to absorb.

Analysis system 130 uses approach temperature 240, CDU Dt/kW 230, total heat load into the liquid 220, and GPU TDP 113, to calculate a comparison factor 250, e.g., as described below. From comparison factor 250, GPU $T_{case/junction}$ estimate 141 is derived, as shown in Eqn. 30a, below. The derived GPU $T_{case/junction}$ estimate 141 is then compared with the GPU $T_{case/junction}$ spec 114 from the GPU vendor to determine how the estimate compares to an acceptable range. GPU $T_{case/junction}$ estimate 141 is exemplary, and represents how each assessment 141-147 within assessment 140 may be derived using analysis system 130.

In embodiments, analysis system 130 utilizes extensive amounts of test and simulation data, such as L10, L11, and L12 inputs, and analyzes the data using, e.g., the equations provided within, to provide one or more assessments of how one or more target systems, e.g., the potential cooling solutions, might perform when combined with a base system, e.g., a rack system. In other words, analysis system 130 may be used to create assessments, e.g., assessment 131 regarding a GPU $T_{case/junction}$ criteria, by calculating an estimate, e.g., GPU $T_{case/junction}$ estimate 141, and comparing that estimate to a specification, e.g., GPU T $T_{case/junction}$ spec 114, to determine how well a target system, e.g., a cooling solution, may perform with a baseline air cooled system. Such assessments for various cooling solutions may be used to compare the various cooling solutions regarding their relative suitability for use with the base system.

To arrive at assessment 131, analysis system uses the number of GPUs per server 211, the GPU TDP 113, the number of GPU switches 118, the GPU switch power 119, cold plate HCR 212 (cold plate vendor and design 213 is an input in the sense that it controls which cold plate HCR 212 is used), servers per rack 125, and racks per CDU 126, are used according to Eq. 1, below, to determine the total heat load into the liquid 220. The GPU $T_{case/junction}$ estimate 141 is compared to the GPU $T_{case/junction}$ spec 114 according to the comparison discussed below to provide assessment 131, which assists the user in evaluating whether the particular cooling system will adequately cool the GPUs and be suitable for its intended purpose. In the embodiment, the coldplate being used by GPU and the coldplate being used by switches is the same type of coldplate and the L10 inputs for the coldplate reflect that. In other embodiments, the GPU and switches may be equipped with different coldplates and the equations adapted to account for the coldplate difference.

Figure 3:
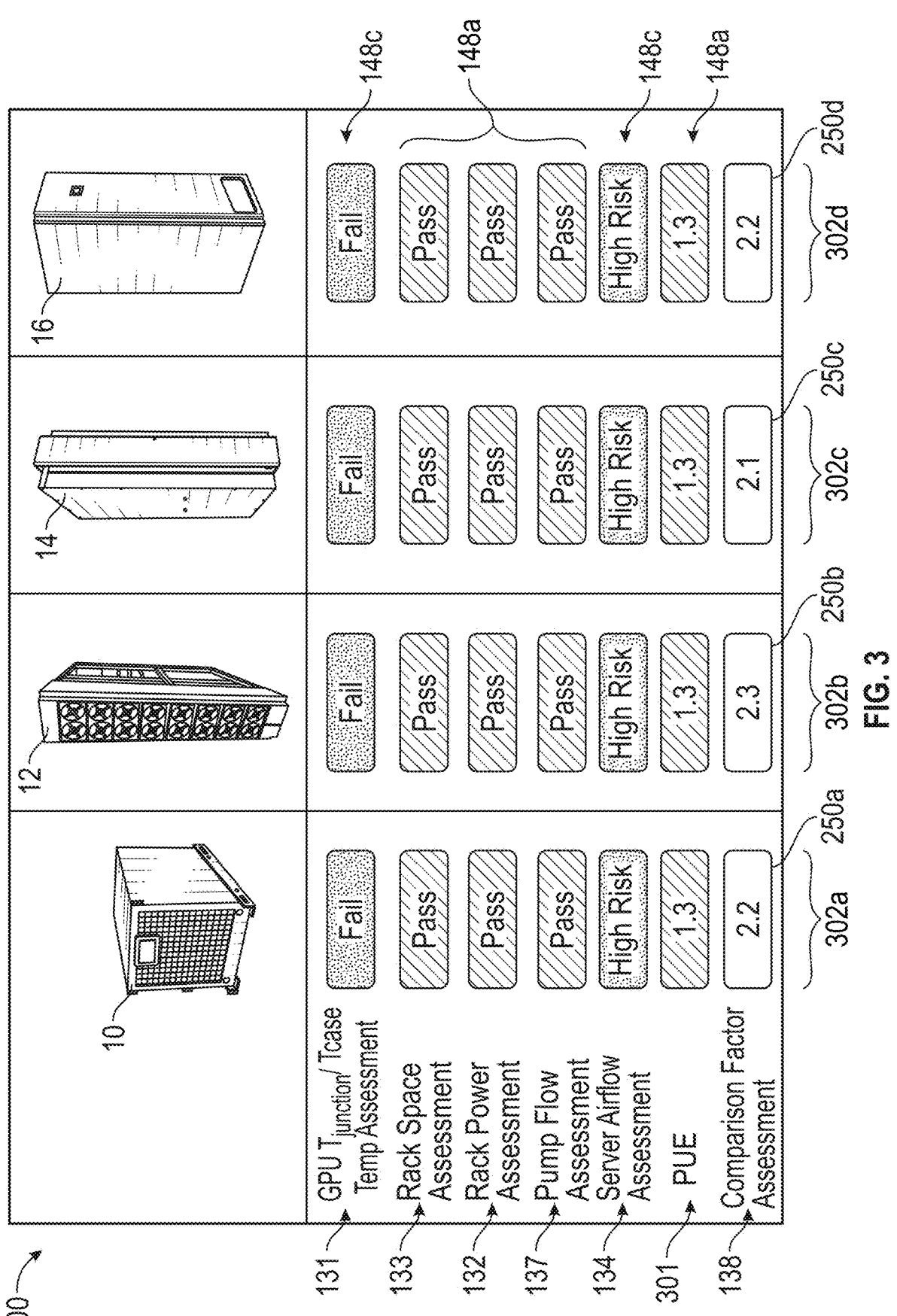
FIG. 3 is a screenshot of a display showing results of a method for estimating cooling system suitability.

In an embodiment, comparison factor 250 may be computed using CDU Dt/kW 230, GPU TDP 113, total heat load into the liquid 220 and coldplate thermal resistance (Rcl 436 or Rjl 437) according to the following: comparison factor 250=CDU DT/KW 230×Total heat load into the liquid 220/GPU TDP 113+ (Rcl 436 or Rjl 437), which is reproduced below as Equation 22a. Certain equations below may use comparison factor 250 to determine an assessment estimate. Comparison factor 250 is a metric that describes the system as a whole by combining qualities of both the base rack system (i.e., GPU TDP (W) 113, (Rcl 436 or Rjl 437) and the total heat load into the liquid (W) 220) with qualities of the potential target cooling system (i.e., CDU Dt/kW 230). Thus, qualities of both the heat supply side—the base rack system—and the heat return side—the target potential cooling system—are combined in a single metric that provides an indication of how well the two sides work together. In other words, comparison factor 250, which has units of T/W, provides an indication of the relative efficiency of the combination of the base heat producing system and the target potential cooling system, i.e., an indication of the change in temperature per watt of input heat. In an embodiment, comparison factor 250 for each particular target cooling system may be displayed along with assessments 131 . . . 137 as a comparison factor assessment 138 to assist in comparing target potential systems, e.g., cooling systems 10, 12, 14, 16 (FIG. 3).

In an embodiment, the following equations may be used to determine the estimates for the categories of the assessments in FIG. 2-FIG. 5 for a single target potential cooling solution. Multiple potential cooling solutions require the set be used separately for each potential cooling solution. In embodiments, a particular target potential cooling solution may not be described by the exact set of equations below. In such cases, the set may be modified with equations altered, added, and/or subtracted. Similarly, the input data may be altered, added to, and/or extracted from to suit the target potential cooling solution. In the following, "[Eq. X]" is used later to represent the source of the value, and is not an element of the equation:

Heat load into liquid (per server)(kW) 424=GPU TDP 113\*Coldplate Efficiency 212\*Number ofGPU per server 211+GPU Switch Power 119\*Coldplate Efficiency 212\*Number of GPU Switches 118       Equation 1

L10 Server Power (kW) [Eq. 2]=(Server Power (without Fan) 116)/(1−Server Fan Power (%) 514)       Equation 2

Heat load into air per server (kW) [Eq. 3]=L10 Server Power [Eq. 2]−Heat load into liquid per server 424       Equation 3

Fan Power (kW) [Eq. 4]=Server Fan Power (%) 514\*L10 Server Fan power [Eq. 2]       Equation 4

L10 Liquid Heat Capture Rate (%) 427=(Heat load into liquid per server 424)/(L10 Server Power [Eq. 2])       Equation 5

Total Rack Power (kW) 311=L10 Server Power [Eq. 2]\*Servers per Rack 125+Other Hardware Power 423       Equation 6

L11 Liquid Heat Capture rate (%) 428=(Heat load into liquid (per Server) 424\*Servers per rack 125)/(Rack Power [Eq. 6])       Equation 7

CDU Fan Power (kW) 430=f (Fan PWM 514 based on test or Vendor data)       Equation 8

Pump Power (kW) 459=f (Pump PWM spec 123 based on test or Vendor data)       Equation 9

CDU Power (kW) 431=CDU Fan Power 430+Pump Power 459       Equation 10

Total Electrical Power (kW) 432=Racks per CDU 126\*Racks Power [Eq. 6]+CDU Power 431       Equation 11

Effective Electrical Power (Normalized Per server) (kW) 433=(Total Electrical Power 432)/((Servers per Rack 125\*Racks per CDU 126))       Equation 12

L12 Aiflow available per server (CFM) 434=Effective Electrical Power (Normalized Per server) 433\*Server airflow (CFM/kW) estimate 144       Equation 13

CDU Airflow (CFM) 308=f (Fan PWM 514 based on test or Vendor data)       Equation 14

Airflow available per Rack (CFM) 435=(L12 Airflow available per server 434–CDU Airflow 308)/(Racks per CDU spec 126)     Equation 15

Air flow available per Server 434=(Airflow available per Rack 435)/(Servers per rack spec 125)     Equation 16

Server airflow (CFMlKW) estimate 144=((Airflow available per Server 434))/(Server Power [Eq. 2])     Equation 17

Coldplate Rca or Rcl 436=f (Coldplate vendor 213 based on Vendor or Test data)     Equation 18

Coldplate Rja 436 or Rjl 437=f (Coldplate vendor 213 based on Vendor or Test data)     Equation 19

((Flow rate)/(Liquid Heat load (kW))) 440=(Liquid Flow rate 439)/(Heat into liquid per rack [Eq. 28])     Equation 29

GPU $T_{case/junction}$ estimate 141=(Rcl 436 or Rjl 437)*GPU TDP 113+Server Liquid Inlet Temperature (C) estimate 145     Equation 30

GPU $T_{case/junction}$ estimate 141=GPU TDP 113*Comparison Factor 250+Ambient Air Temp (C) 117     Equation 30a Total Rack Space 511=Server Size 505*Number of servers per rack 125+Other Hardware used space (including CDU) 517     Equation 31

Total Cooling Power per rack 455=(Fan Power (kW) [Eq. 4]*Servers per Rack 125 Racks per CDU 126)+CDU Power     Equation 32

Equation 33

$$PUE\ 301 = \frac{\text{Total Electrical Power (kW) 432}}{\text{Total Electrical Power (kW) 432} - \text{Total Cooling Power per rack 455}}$$

CDU DT/KW 230=f (CDU Fan PWM % utilization spec 124, CDU Pump PWM % spec 123 based on Vendor or Test Data)     Equation 20

Total heat load into liquid 220=Heat load into liquid (per Server) 424*Servers per Rack spec 125*Racks per CDU spec 126     Equation 21

Approach Temperature (C) 240=CDU DT/KW 230*Total Heat load into liquid 220     Equation 22

Comparison factor 250=(CDU DT/KW 230)×Total heat load into liquid 220/GPU TDP 113+(Rcl 436 or Rjl 437)     Equation 22a Effective CDU resistance (GPU Power normalized) (C/W) 438=(Approach Temperature (C) 240)/ (GPU TDP (W) 113)     Equation 23

Server Liquid Inlet Temperature (C) estimate 145-Approach Temperature (C) 240+Ambient Air Temp (C) 117     Equation 24

Server Liquid Inlet Temperature (C) estimate 145= (Comparison Factor 250–(Rcl 436 or Rjl 437)) *GPU TDP 113+Ambient Air Temp (C) 117     Equation 24a Server Liquid Outlet Temperature (C) estimate 146=Server Liquid Inlet Temperature (C) estimate 145+(GPU TDP (W) 113)/(Coldplate Flowrate (kg/s) 112*Liquid specific heat capacity)     Equation 25

Server Liquid Outlet Temperature (C) estimate 146= (Comparison Factor 250–(Rcl 436 or Rjl 437))*GPU TDP 113+Ambient Air Temp (C) 117+(GPU TDP (W) 113)/(Coldplate Flowrate (kg/s) 112*Liquid specific heat capacity)     Equation 25a Liquid Flow rate (LPM) 439=Coldplate flow rate 112*Number ofGPU per Server 211*Number of servers per rack 125*Number of racks per CDU 126     Equation 26

Max Pump Capacity [Eq. 27.]=f (CDU 121 based on Vendor or Test Data)     Equation 27

Heat into liquid per rack [Eq. 28]=(Heat load into liquid (per server) (kW) 424)/(Number of servers per rack 125)     Equation 28

Exemplary limits for assessment 140 (FIG. 1)

Assessment 134 of server airflow (CFM/kW) estimate 144:

If Server airflow (CFM/kW) estimate 144≥server airflow spec (CFM/KW) 127*0.5→Low Risk If server airflow spec (CFM/KW) 127*0.3>Air flow available per Server estimate 144≥server airflow spec (CFM/KW) 127*0.5→Medium Risk Else→High Risk Assessment 134 of rack space estimate 143:

If Total Rack Space 511≤Rack Space estimate 143—2→Low Risk

If Rack Space Estimate 143—2<Total Rack Space 511≤Rack Space estimate 143→Medium Risk Else→High Risk Assessment 132 of rack power estimate 142:

If Total Rack Power 311≤Rack Power estimate 142—5→Low Risk

If Rack Power estimate142—5<Total Rack Power 311≤Rack Power estimate 142→Medium Risk Else→High Risk Assessment 131 of GPU $T_{case/junction}$ estimate 141:

If GPU $T_{case/junction}$ estimate 141≤GPU $T_{case/junction}$ Spec 114—3→Low Risk If GPU $T_{case/junction}$ Spec 114—3<GPU $T_{case/junction}$ estimate 141<GPU $T_{case/junction}$ Spec 114→Medium Risk Else→High Risk Assessment 137 of pump flow estimate 147:

If Liquid Flow rate 439≤Max Pump Capacity 401—5→Low Risk

If Max Pump Capacity 401—5<Liquid Flow rate 439≤Max Pump Capacity 401→Medium Risk Else→High Risk Assessment 135 of server liquid inlet temperature estimate 145:

If Server Liquid Inlet Temperature Estimate 145≤62→Low Risk

If 62<Server Liquid Inlet Temperature Estimate 145≤65→Medium Risk

Else→High Risk

FIG. 3 is a screenshot 300 of a display showing results of an embodiment of a method for estimating the suitability of a potential target system addition, e.g., a cooling system. In FIG. 3, screenshot 300 displays illustrations of exemplary potential system additions 10 (In-rack liquid to air), 12 (rear door), 14 (Sidecar-Twin), 16 (L-L CDU). For each potential system, screenshot 300 shows that analysis system 130 has developed an assessment set 302a . . . 302d, similar to assessment 140 (FIG. 1) using different sets of data input for each system and the equations previously discussed, modified as needed for each system. Each set includes an assessment of the performance of the potential system against: GPU $T_{case/junction}$ estimate 141, rack space estimate 143, rack power estimate 142, pump flow estimate 147, and server airflow (CFM/kW) estimate 144. The row of comparison factor assessment 138 row provides a comparison factor 250 for each system, i.e., comparison factors 250a . . . 250d. GPU $T_{case/junction}$ estimate 141, rack space estimate 143, rack power estimate 142, pump flow estimate 147, and server airflow (CFM/KW) estimate 144 are evaluated against criteria developed by analysis system 130 as discussed previously. PUE 301 and comparison factors 250a . . . 250d may be compared between the systems. For comparison factor assessment 138, the lower comparison value 250a . . . 250d indicates a better overall system. For PUE assessment 301, the higher PUE value indicates a better system. The performance of each system for the assessments 131 . . . 134, 137 are indicated by a pass/fail indication. The assessment of each criteria is further indicated by a visual indication 148a, 148b, 148c of the relative performance of the system against a standard. In screenshot 300, visual indication 148a is a cross-hatch given to assessments of "pass" or "low risk," indication 148b is a cross-hatch given to assessments of "medium risk," (none shown in FIG. 3), and visual indication 148c is a cross-hatch given to assessments indicating "fail" or "high risk." Thus, screenshot 300 shows that the display provides a way to visually compare the performances of the potential system additions. In this example, the visual indication is that all potential systems are relatively equivalent. However, in some embodiments, the display of systems 10 . . . 16 may be dynamic based on results of the assessments. For example, systems 10 . . . 16 and their associated assessments may be rearranged displayed in an order based on one or more of the assessments. For example, in FIG. 3, since a lower comparison factor is preferable, the assessments may be rearranged in order of increasing comparison values 250a . . . 250d to show which system has the better comparison factor assessment. In such an embodiment, systems 10 . . . 16 would be displayed, from left to right, with system 14 first, then systems 10 and 16, then system 12.

FIG. 3 illustrates the extreme utility provided by the display, as indicated by screenshot 300, to display the assessments generated for each target solution. Each combination of a target system and base system is too complicated to be completely evaluated by any single metric. Determining the multiple assessments for evaluating a combination of target system and base system is a complex task. Further determining the multiple assessments for multiple combinations of target systems with the base system makes an already complex task entirely unwieldy. Then, to properly choose from among the potential target systems requires that the results be visualized, e.g., side-by-side, for comparison. Embodiments therefore enable the user to successfully evaluate, and choose from among, multiple potential target systems.

FIG. 4 is a screenshot 400 of a display showing results of a method for estimating the suitability of a target potential system addition, e.g., a cooling system, to be compared with a baseline air-cooled system. In FIG. 4, screenshot 400 displays an L11 air cooled baseline target system 18 and target potential system additions 12 . . . 16 and 20 . . . 28 across the top. Baseline target system 18 is selected to be an air-cooled solution because, typically, customers prefer to use an air-cooled as much as possible. Along the side, screenshot 400 displays L10/L11 inputs 402, L10/L11/L12 inputs 404, assessments 406, L10/L11 analyses 408 (an analysis using L10 inputs, or L11 inputs, respectively), and L12 analyses 410 (an analysis using L12 inputs). In L10/L11 inputs 402, L10 inputs include inputs discussed previously. In L10/L11/L12 inputs 404, L10 inputs further include: a server size (U) 505, a server fan power % 514. Server fan power % 514 is an amount of fan power being used as a percentage of the total available power. In contrast, CDU fan PWM % utilization spec 124 is the speed setting on the CDU system fans. L11 inputs further include: an other hardware power 423, a racks per CDU 516, and other hardware used space 517 (note: servers per rack 125\*racks per CDU 516=servers per CDU 307). In L10/L11 analyses 408, L10 analyses further include: a heat load into liquid (per server) kW 424, a server fan power (kW) 426, and a liquid heat capture rate (%) 427. An L11 analysis includes: a liquid heat capture rate (%) 428. L12 analyses 410 further include: a total heat load into liquid (kW) 220; a CDU fan power (kW) 430, a CDU power (kW) 431, a total electrical power (Rack+CDU) (kW) 432, an effective electrical power (kW) normalized per server 433, an airflow available (CFM) per server 434, an airflow available per Rack (CFM) 435, a cold plate thermal resistance Rca/Rcl (C/W) 436, a cold plate Rja/Rjl (C/W) 437, an effective CDU resistance (GPU power normalized) 438, a liquid flow rate (LPM) 439, a maximum pump capacity (LPM) 401, and a flow rate/liquid heat load (LPM/kW) 440.

In FIG. 4, from assessments 406, is may be quickly seen that all potential systems, including baseline 18, fail criteria of GPU $T_{case/junction}$ estimate 141 and that only systems 14, 16, 22, 24, and 28 have a low risk regarding criteria server airflow (CFM/KW) estimate 144. Screenshot 400 may further include comparison factors 250 for each system and/or PUE values as in FIG. 3.

Figure 5:
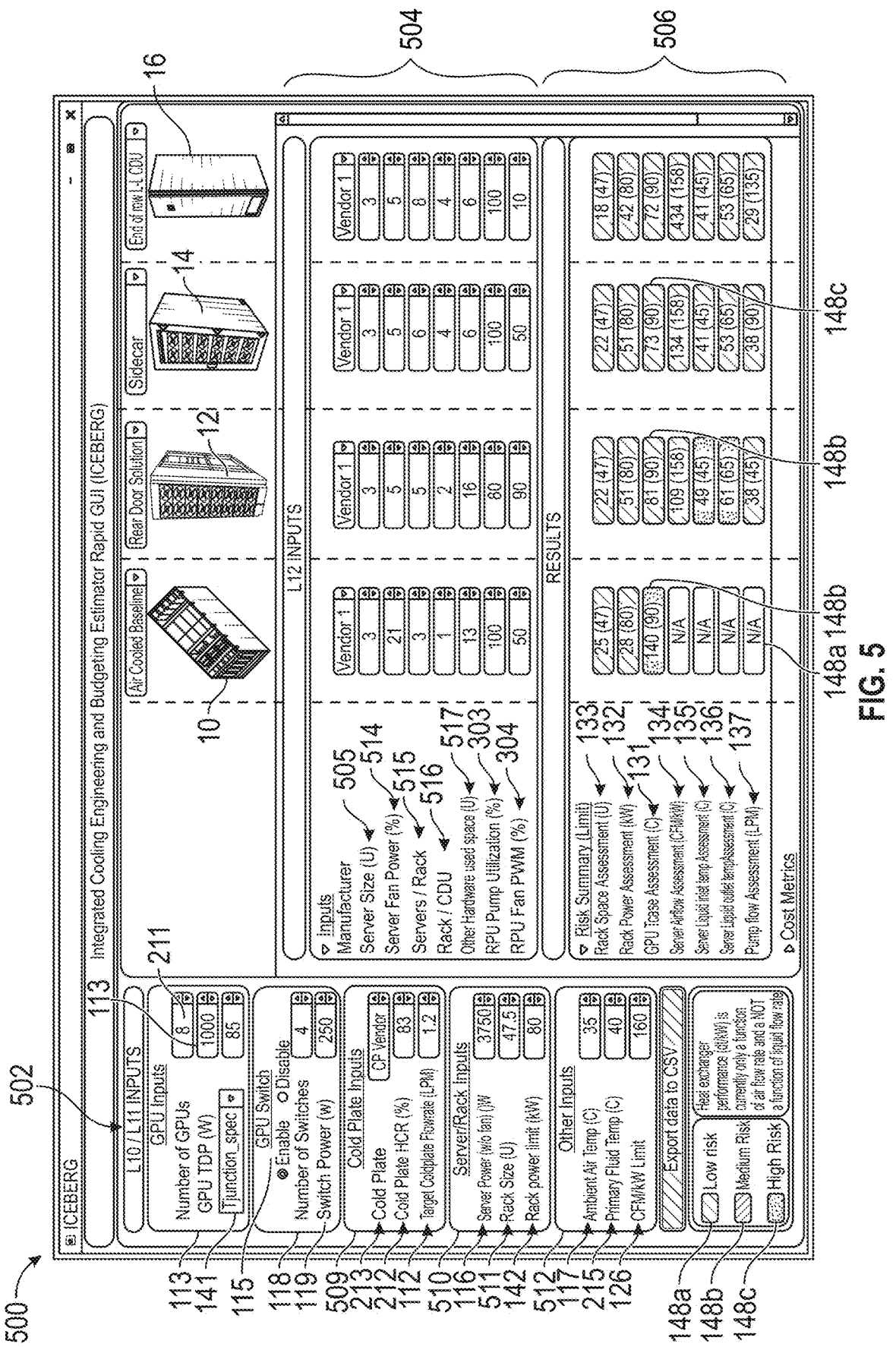
FIG. 5 is a screenshot of a display showing results of a method for estimating cooling system suitability.

FIG. 5 is a screenshot 500 of a display showing results of a method for estimating the suitability of a potential system addition, e.g., a cooling system. In FIG. 5, screenshot 500 displays potential systems 14, 16, and 20, L10/L11 user inputs 502, L12 user inputs 504, and assessments 506. L10 inputs further include GPU TDP 113 and have been grouped by: cold plate inputs 508, server per rack inputs 510, and other inputs 512. Server per rack inputs further include an L11 input of a rack space (U) 511. L12 inputs 504 further include: a reservoir and pumping unit (RPU) Pump utilization (%) 303, and RPU Fan PWM (%) 304.

In FIG. 5, assessments 506 provide a user with a quick visual indication that only end row liquid to liquid CDU system 16 has low risk 148a for every criterion. Screenshot 500 may further include comparison factors 250 for each system and/or PUE values as in FIG. 3.

In an embodiment, analysis system 130 may develop a total cost of ownership (TCO) 441 including, e.g., the operating costs and capital costs for a small/medium/large cluster deployment. Such a feature assists with identifying issues in hardware engineering, developing a global supply chain, and program management while the architecture phase is in progress. Developing a TCO for each target potential cooling system may include processing input including one or more of: total cooling power 442; server fan plus CDU fan plus CDU pump power 443; power utilization for cooling 444; server air cooling cost 445; liquid cooling cost 446; total number of serves per cluster 447; cost of L10 equipment (coldplates, internal manifold, fans and heat sinks) 448; L11 equipment cost (rack manifold cost) 449;

CDU (capital cost plus installation and commissioning) 450; cost per kWh 451; CDUs required 452; total cluster level capital cost 454; number of racks per CDU 126; total cooling power per rack 455; cost per year 456; total servicing cost 457; total operating cost 458; pump power 459; or specifications 460.

In embodiments, analysis system 130 may include one or more of the following features: a computation engine (executed using, e.g., Excel and Python) and a user interface that has a broad variety of inputs and side by side comparison of multiple cooling solutions; accurate predictions based on in-house measurements; and the ability to export all data to csv for further analysis and plotting.

In an embodiment, analysis system 130 may include a computational engine that: provides a solution accounting for all variables from L10 to L12 that are relevant to a particular potential system addition, e.g., a cooling solution; and applies a uniform thermal qualification methodology across different types of cooling solutions, e.g., employing comparison factor 250.

In an embodiment, comparison factor 250 may be calculated as follows:

At the L10 level:

$$\text{Rcl } 436 \text{ or Rjl } 437 = (\text{GPU } T_{case/junction} \text{ estimate } 141 - T \text{ Server Liquid Inlet Temperature } 145)/(\text{GPU TDP } 113)$$

At the L12 Level:

$$\text{CDU DT/KW } 230 = (\text{Approach Temperature } 240)/(\text{Total Heat Load into Liquid } 220) = (T \text{ Server Liquid Inlet Temperature } 145 - T \text{ ambient air } 117)/(\text{Total Heat Load into Liquid } 220)$$

In this equation $T_{ambient\ air}$ 117 is used for a liquid to air CDU and $T_{primary\ inlet}$ would be used for a liquid to liquid CDU.

Merging these equations:

$$(\text{GPU } T_{case/junction} \text{ estimate } 141 - T \text{ ambient air } 117)/(\text{GPU TDP } 113) = \text{Rcl } 436 \text{ or Rjl } 437 + (\text{CDU DT/KW } 230)*(\text{Total heat load into Liquid } 220)/\text{GPU TDP } 113$$

In this equation $T_{ambient\ air}$ 117 is used for a liquid to air CDU and $T_{primary\ inlet}$ would be used for a liquid to liquid CDU.

The equation previously given for Comparison Factor was:

$$\text{Comparison factor } 250 = (\text{CDU DT/KW } 230) \times \text{Total heat load into liquid } 220/\text{GPU TDP } 113 + \text{Rcl } 436 \text{ or Rjl } 437$$

Inserting comparison factor 250 into the previous merged equation yields:

$$(\text{GPU } T_{case/junction} \text{ estimate } 141 - T_{ambient\ air} \text{ } 117)/(\text{GPU TDP } 113) = \text{Comparison factor } 250 \text{ Thus:}$$
$$(\text{GPU } T_{case/junction} \text{ estimate } 141 - T_{ambient\ air} \text{ } 117) = (\text{GPU TDP } 113)*\text{Comparison factor } 250$$

In embodiments, questions answered by the analysis provided by analysis system 130 include one or more of the following: Is $$\frac{DT}{kW}$$

enough ? How many servers can be cooled? Will the pump be able to supply the required flow? Will the coolant loops be able to handle such high temperatures? Will we violate CFM/KW requirement? How much rack space will we occupy? What's the cost to scale?

Figure 6:
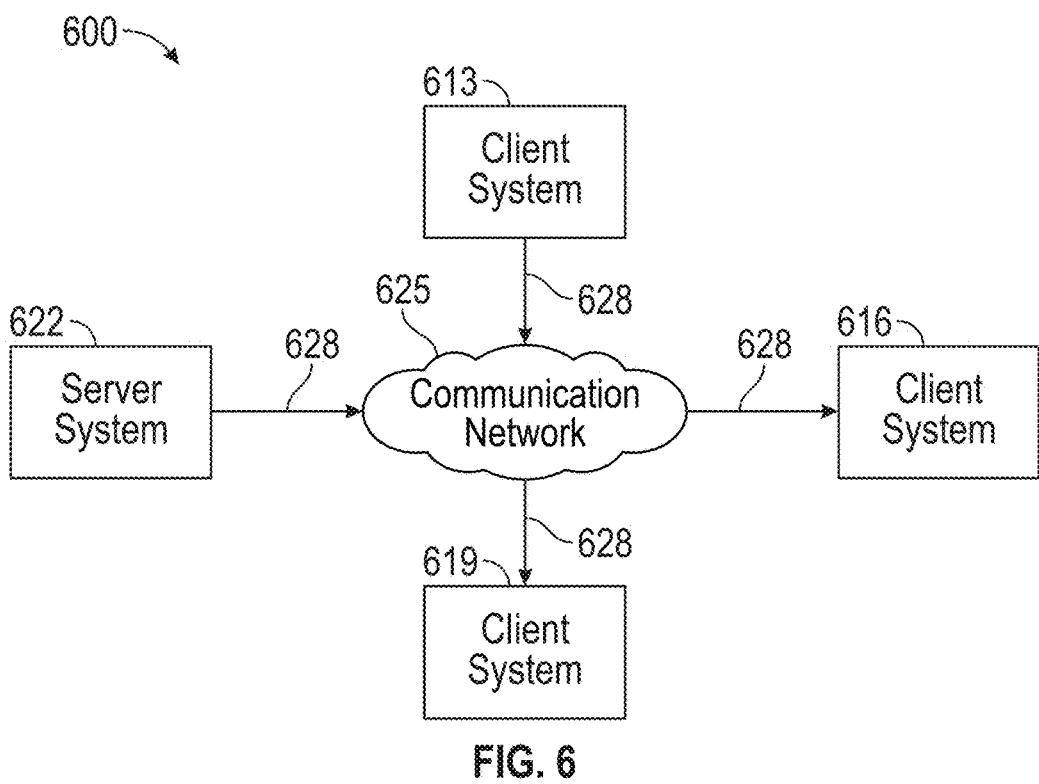
FIG. 6 is an exemplary block diagram depicting an embodiment of system for implement embodiments of meth-ods of the disclosure, e.g., as described with reference to the previous figures, and particularly an analysis system with optional display and an optional comparison factor.

FIG. 6 is an exemplary block diagram depicting an embodiment of system for implement embodiments of methods of the disclosure, e.g., as described with reference to the previous figures, and particularly elements analysis system 130 and comparison factor 250.

In FIG. 6, distributed computer network system 600 includes a number of computing devices, e.g., client systems 613, 616, 619, and one or more server systems 622 coupled to a communication network 625 via a plurality of communication links 628. Communication network 625 provides a mechanism for allowing the various components of distributed network 600 to communicate and exchange information with each other. Thus, FIG. 6 describes systems for implementing elements of the above disclosure, e.g., analysis system 130 and comparison factor 250.

Communication network 625 itself is comprised of one or more interconnected computer systems and communication links. Communication links 628 may include hardwire links, optical links, satellite or other wireless communications links, wave propagation links, or any other mechanisms for communication of information. Various communication protocols may be used to facilitate communication between the various systems shown in FIG. 6. These communication protocols may include TCP/IP, UDP, HTTP protocols, wireless application protocol (WAP), BLUETOOTH, Zigbee, 802.11, 802.15, 6LoWPAN, LiFi, Google Weave, NFC, GSM, CDMA, other cellular data communication protocols, wireless telephony protocols, Internet telephony, IP telephony, digital voice, voice over broadband (VoBB), broadband telephony, Voice over IP (VOIP), vendor-specific protocols, customized protocols, and others. While in one embodiment, communication network 625 is the Internet, in other embodiments, communication network 625 may be any suitable communication network including a local area network (LAN), a wide area network (WAN), a wireless network, a cellular network, a personal area network, an intranet, a private network, a near field communications (NFC) network, a public network, a switched network, a peer-to-peer network, and combinations of these, and the like.

In an embodiment, the server 622 is not located near a user of a computing device and is communicated with over a network. In a different embodiment, the server 622 is a device that a user can carry upon his person or can keep nearby. In an embodiment, the server 622 has a large battery to power long distance communications networks such as a cell network (LTE, 5G), or Wi-Fi. The server 622 communicates with the other components of the system via wired links or via low powered short-range wireless communications such as Bluetooth®. In an embodiment, one of the other components of the system plays the role of the server, e.g., the PC 2310b.

Distributed computer network 600 in FIG. 6 is merely illustrative of an embodiment incorporating the embodiments and does not limit the scope of the invention as recited in the claims. One of ordinary skill in the art would recognize other variations, modifications, and alternatives. For example, more than one server system 622 may be connected to communication network 625. As another example, a number of computing devices 613, 616, 619 may be coupled to communication network 625 via an access provider (not shown) or via some other server system.

Computing devices 613, 616, 619 typically request information from a server system that provides the information. Server systems by definition typically have more computing and storage capacity than these computing devices, which are often such things as portable devices, mobile communications devices, or other computing devices that play the role of a client in a client-server operation. However, a particular computing device may act as both a client and a server depending on whether the computing device is requesting or providing information. Aspects of the embodiments may be embodied using a client-server environment or a cloud-cloud computing environment.

Server 622 is responsible for receiving information requests from computing devices 613, 616, 619, for performing processing required to satisfy the requests, and for forwarding the results corresponding to the requests back to the requesting computing device. The processing required to satisfy the request may be performed by server system 622 or may alternatively be delegated to other servers connected to communication network 625 or to other communications networks. A server 622 may be located near the computing devices 613, 616, 619 or may be remote from the computing devices 613, 616, 619. A server 622 may be a hub controlling a local enclave of things in an internet of things scenario.

Computing devices 613, 616, 619 enable users to access and query information or applications stored by server system 622. Some example computing devices include portable electronic devices (e.g., mobile communications devices) such as the Apple iPhone®, the Apple iPad®, the Palm Pre™, or any computing device running the Apple IOS™, Android™ OS, Google Chrome OS, Symbian OS®, Windows 10, Windows Mobile® OS, Palm OS® or Palm Web OS™, or any of various operating systems used for Internet of Things (IOT) devices or automotive or other vehicles or Real Time Operating Systems (RTOS), such as the RIOT OS, Windows 10 for IoT, WindRiver VxWorks, Google Brillo, ARM Mbed OS, Embedded Apple iOS and OS X, the Nucleus RTOS, Green Hills Integrity, or Contiki, or any of various Programmable Logic Controller (PLC) or Programmable Automation Controller (PAC) operating systems such as Microware OS-9, VxWorks, QNX Neutrino, FreeRTOS, Micrium C/OS-II, Micrium uC/OS-III, Windows CE, TI-RTOS, RTEMS. Other operating systems may be used. In a specific embodiment, a "web browser" application executing on a computing device enables users to select, access, retrieve, or query information and/or applications stored by server system 622. Examples of web browsers include the Android browser provided by Google, the Safari® browser provided by Apple, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others.

Figure 7:
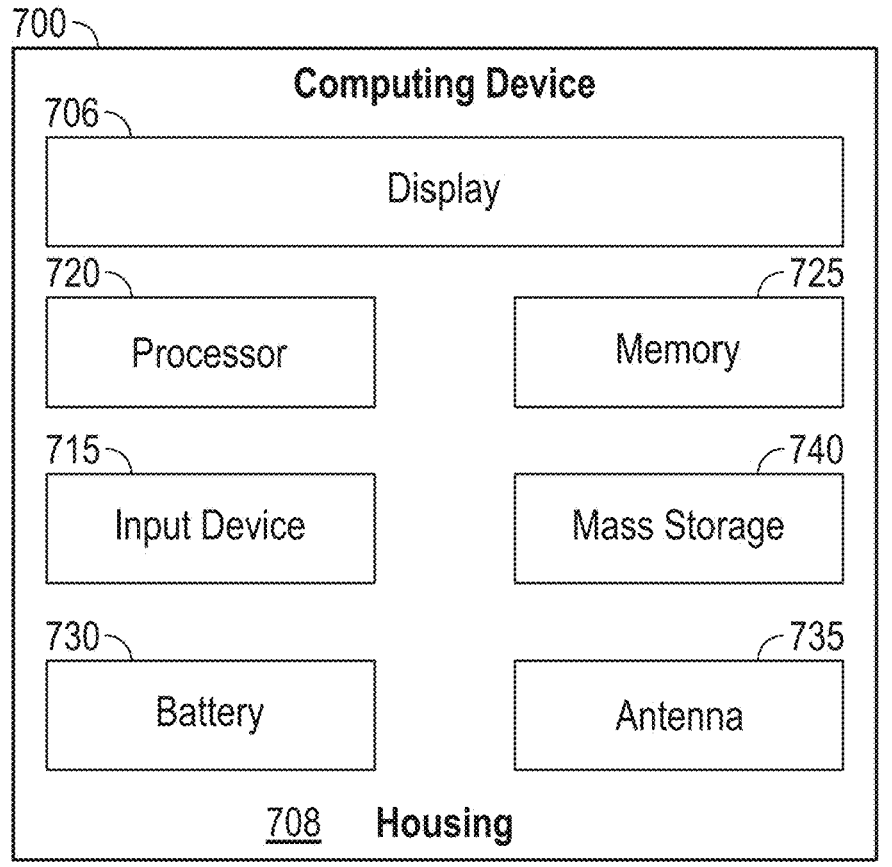
FIG. 7 is an exemplary block diagram depicting a com-puting device of an embodiment.

FIG. 7 is an exemplary block diagram depicting a computing device 700 of an embodiment. Computing device 700 may be any of the computing devices 613, 616, 619 from FIG. 6. Computing device 700 may include a display, screen, or monitor 706, housing 708, and input device 715. Housing 708 houses familiar computer components, some of which are not shown, such as a processor 720, memory 725, battery 730, speaker, transceiver, antenna 735, microphone, ports, jacks, connectors, camera, input/output (I/O) controller, display adapter, network interface, mass storage devices 740, various sensors, and the like.

Input device 715 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

Mass storage devices 740 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, SD cards, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

Embodiments may also be used with computer systems having different configurations, e.g., with additional or fewer subsystems, and may include systems provided by Arduino, or Raspberry Pi. For example, a computer system could include more than one processor (i.e., a multiprocessor system, which may permit parallel processing of information) or a system may include a cache memory. The computer system shown in FIG. 7 is but an example of a computer system suitable for use with the embodiments. Other configurations of subsystems suitable for use with the embodiments will be readily apparent to one of ordinary skill in the art. For example, in a specific implementation, the computing device is a mobile communications device such as a smartphone or tablet computer. Some specific examples of smartphones include the Droid Incredible and Google *Nexus* One, provided by HTC Corporation, the iPhone or iPad, both provided by Apple, and many others. The computing device may be a laptop or a netbook. In another specific implementation, the computing device is a non-portable computing device such as a desktop computer or workstation.

A computer-implemented or computer-executable version of the program instructions useful to practice the embodiments may be embodied using, stored on, or associated with computer-readable medium. A computer-readable medium may include any medium that participates in providing instructions to one or more processors for execution, such as memory 725 or mass storage 740. Such a medium may take many forms including, but not limited to, nonvolatile, volatile, transmission, non-printed, and printed media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the embodiments may be stored or reside in RAM or cache memory, or on mass storage device 740. The source code of this software may also be stored or reside on mass storage device 740 (e.g., flash drive, hard disk, magnetic disk, tape, or CD-ROM). As a further example, code useful for practicing the embodiments may be transmitted via wires, radio waves, or through a network such as the Internet. In another specific embodiment, a computer program product including a variety of software program code to implement features of the embodiment is provided.

Computer software products may be written in any of various suitable programming languages, such as C, C++, C#, Pascal, Fortran, Perl, Matlab (from MathWorks, www-.mathworks.com), SAS, SPSS, JavaScript, CoffeeScript, Objective-C, Swift, Objective-J, Ruby, Rust, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Symbian, Black-Berry OS, Palm web OS, Bada, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 10 or other Windows versions, Windows CE, Windows Mobile, Windows Phone, Windows 10 Mobile), Linux, HP-UX, UNIX, Sun OS, Solaris, Mac OS X, Alpha OS, AIX, IRIX32, or IRIX64, or any of various operating systems used for Internet of Things (IOT) devices or automotive or other vehicles or Real Time Operating Systems (RTOS), such as the RIOT OS, Windows 10 for IoT, WindRiver VxWorks, Google Brillo, ARM Mbed OS, Embedded Apple IOS and OS X, the Nucleus RTOS, Green Hills Integrity, or Contiki, or any of various Programmable Logic Controller (PLC) or Programmable Automation Controller (PAC) operating systems such as Microware OS-9, Vx Works, QNX Neutrino, FreeRTOS, Micrium uC/OS-II, Micrium uC/OS-III, Windows CE, TI-RTOS, RTEMS. Other operating systems may be used.

Furthermore, the computer may be connected to a network and may interface to other computers using this network. The network may be an intranet, internet, or the Internet, among others. The network may be a wired network (e.g., using copper, and connections such as RS232 connectors), telephone network, packet network, an optical network (e.g., using optical fiber), or a wireless network, or any combination of these. For example, data and other information may be passed between the computer and components (or steps) of a system useful in practicing the embodiments using a wireless network employing a protocol such as Wi-Fi (IEEE standards 802.11, 802.11a, 802.11b, 802.11c, 802.11 g, 802.11i, and 802.11n, just to name a few examples), or other protocols, such as BLUETOOTH or NFC or 802.15 or cellular, or communication protocols may include TCP/IP, UDP, HTTP protocols, wireless application protocol (WAP), BLUETOOTH, Zigbee, 802.11, 802.15, 6LoWPAN, LiFi, Google Weave, NFC, GSM, CDMA, other cellular data communication protocols, wireless telephony protocols or the like. For example, signals from a computer may be transferred, at least in part, wirelessly to components or other computers.

Consistent with the foregoing, in at least one case referred to herein as Example A-1, a method of displaying relative system suitability on a display comprises: receiving first data regarding a target system; receiving second data regarding a first potential system; determining using the first data and the second data, a first suitability level associated with using the first potential system with the target system, the first suitability level representing a first indicia of how the first potential system will perform with the target system; and causing a first dynamic visual indicator representative of the first suitability level to be displayed on the display.

In another case referred to herein as Example A-2, the method of Example A-1, or any other exemplary embodiment described herein, may further comprise: determining, using the first data and the second data, a second suitability level representing a second indicia of how the first potential system will perform with the target system; and causing a second dynamic visual indicator representative of the second suitability level to be displayed on the display.

In another case referred to herein as Example A-3, the method of Example A-1, or any other exemplary embodiment described herein, may further comprise: receiving third data regarding a second potential system; determining for the second potential system, using the first data and the third data, a third suitability level representing third indicia of how the second potential system will perform with the target system; and causing a second dynamic visual indicator representative of the second suitability level to be displayed on the display.

In another case referred to herein as Example A-4, the method of Example A-3, or any other exemplary embodiment described herein, may be further limited wherein each suitability level is indicated using the dynamic visual indicators as one of low risk, medium risk or high risk.

In another case referred to herein as Example A-5, the method of Example A-4, or any other exemplary embodiment described herein, may be further limited wherein the low risk is represented by a first color of the dynamic visual indicators, medium risk is represented by a second color of the dynamic visual indicators and high risk is represented by a third color of the dynamic visual indicators In another case referred to herein as Example A-6, the method of Example A-2, or any other exemplary embodiment described herein, may further comprise determining a comparison factor using a coolant distribution unit (CDU) efficiency from the second data and a quantity of heat transmitted by the target system determined from the first data.

In another case referred to herein as Example A-7, the method of Example A-8, or any other exemplary embodiment described herein, may further comprise: using the comparison factor to determine the first suitability level for the first potential system; and using the comparison factor to determine the second indicia of performance for the first potential system.

Consistent with the foregoing, in at least one case referred to herein as Example B-1, a system comprises: one or more processors; and a non-transitory computer readable medium storing a plurality of instructions, which when executed, cause the one or more processors to: receive first data regarding a target system; receive second data regarding a first potential system; determine using the first data and the second data, a first suitability level associated with using the first potential system with the target system, the first suitability level representing a first indicia of how the first potential system will perform with the target system; and cause a first dynamic visual indicator representative of the first suitability level to be displayed on the display.

In another case referred to herein as Example B-2, the system of Example B-1, or any other exemplary embodiment described herein, may be further limited wherein the plurality of instructions further cause the one or more processors to: determine, using the first data and the second data, a second suitability level representing a second indicia of how the first potential system will perform with the target system; and cause a second dynamic visual indicator representative of the second suitability level to be displayed on the display.

In another case referred to herein as Example B-2, the system of Example B-1, or any other exemplary embodiment described herein, may be further limited wherein the plurality of instructions further cause the one or more processors to: receive third data regarding a second potential system; determine for the second potential system, using the first data and the third data, a third suitability level representing third indicia of how the second potential system will perform with the target system; and cause a second dynamic visual indicator representative of the second suitability level to be displayed on the display.

In another case referred to herein as Example B-3, the system of Example B-2, or any other exemplary embodiment described herein, may be further limited wherein each suitability level is indicated using the dynamic visual indicators as one of low risk, medium risk or high risk.

In another case referred to herein as Example B-4, the system of Example B-3, or any other exemplary embodiment described herein, may be further limited wherein the low risk is represented by a first color of the dynamic visual indicators, medium risk is represented by a second color of the dynamic visual indicators and high risk is represented by a third color of the dynamic visual indicators In another case referred to herein as Example B-5, the system of Example B-1, or any other exemplary embodiment described herein, may be further limited wherein the plurality of instructions further cause the one or more processors to determine a comparison factor using a coolant distribution unit (CDU) efficiency from the second data and a quantity of heat transmitted by the target system determined from the first data.

In another case referred to herein as Example B-6, the system of Example B-5, or any other exemplary embodiment described herein, may be further limited wherein the plurality of instructions further cause the one or more processors to: use the comparison factor to determine the first suitability level for the first potential system; and use the comparison factor to determine the second indicia of performance for the first potential system.

Consistent with the foregoing, in at least one case referred to herein as Example C-1, a computer program product comprises a non-transitory computer-readable medium having computer-readable program code embodied therein to be executed by one or more processors, the program code including instructions to: receive first data regarding a target system; receive second data regarding a first potential system; determine using the first data and the second data, a first suitability level associated with using the first potential system with the target system, the first suitability level representing a first indicia of how the first potential system will perform with the target system; and cause a first dynamic visual indicator representative of the first suitability level to be displayed on the display.

In another case referred to herein as Example C-2, the computer program product of Example C-1, or any other exemplary embodiment described herein, may be further limited wherein the program code includes further instructions to: determine, using the first data and the second data, a second suitability level representing a second indicia of how the first potential system will perform with the target system; and cause a second dynamic visual indicator representative of the second suitability level to be displayed on the display.

In another case referred to herein as Example C-3, the computer program product of Example C-1, or any other exemplary embodiment described herein, may be further limited wherein the plurality of instructions further cause the one or more processors to: receive third data regarding a second potential system; determine for the second potential system, using the first data and the third data, a third suitability level representing third indicia of how the second potential system will perform with the target system; and cause a second dynamic visual indicator representative of the second suitability level to be displayed on the display.

In another case referred to herein as Example C-4, the computer program product of Example C-3, or any other exemplary embodiment described herein, may be further limited wherein each suitability level is indicated using the dynamic visual indicators as one of low risk, medium risk or high risk.

In another case referred to herein as Example C-5, the computer program product of Example C-4, or any other exemplary embodiment described herein, may be further limited wherein the low risk is represented by a first color of the dynamic visual indicators, medium risk is represented by a second color of the dynamic visual indicators and high risk is represented by a third color of the dynamic visual indicators In another case referred to herein as Example C-6, the computer program product of Example C-2, or any other exemplary embodiment described herein, may be further limited wherein the plurality of instructions further cause the one or more processors to: determine a comparison factor using a coolant distribution unit (CDU) efficiency from the second data and a quantity of heat transmitted by the target system determined from the first data; use the comparison factor to determine the first suitability level for the first potential system; and use the comparison factor to determine the second indicia of performance for the first potential system.

While the embodiments have been described with regards to particular embodiments, it is recognized that additional variations may be devised without departing from the inventive concept. For example, some specific flows are presented in this application, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

The terminology used herein is for the purpose of describing particular embodiments only and is not intended to be limiting of the claimed subject matter. As used herein, the term "and/or" includes any and all combinations of one or more of the associated listed items. As used herein, the singular forms "a," "an," and "the" are intended to include the plural forms as well as the singular forms, unless the context clearly indicates otherwise. It will further be understood that the terms "comprises" and/or "comprising," when used in this specification, specify the presence of states features, steps, operations, elements, and/or components, but do not preclude the present or addition of one or more other features, steps, operations, elements, components, and/or groups thereof.

Unless otherwise defined, all terms (including technical and scientific terms) used herein have the same meaning as commonly understood by one having ordinary skill in the art to which the embodiments belong. It will further be understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the embodiments, it will be understood that a number of elements, techniques, and steps are disclosed. Each of these has individual benefit and each can also be used in conjunction with one or more, or in some cases all, of the other disclosed elements, or techniques. The specification and claims should be read with the understanding that such combinations are entirely within the scope of the embodiments and the claimed subject matter.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples and are not meant to be limiting in any way. Other steps and functions may be contemplated without departing from this disclosure or the scope of an embodiment.

What is claimed is:

1. A method of displaying relative system suitability on a display comprising:
    receiving first data regarding a target system;
    receiving second data regarding a first potential system;
    determining a comparison factor using a coolant distribution unit (CDU) efficiency from the second data and a quantity of heat transmitted by the target system determined from the first data;
    determining using the first data, the second data and the comparison factor, a first suitability level associated with using the first potential system with the target system, the first suitability level representing a first indicia of how the first potential system will perform with the target system; and
    causing a first dynamic visual indicator representative of the first suitability level to be displayed on the display.

2. The method of claim 1, further comprising:
    determining, using the first data and the second data, a second suitability level representing a second indicia of how the first potential system will perform with the target system; and
    causing a second dynamic visual indicator representative of the second suitability level to be displayed on the display.

3. The method of claim 1, further comprising:
    receiving third data regarding a second potential system;
    determining for the second potential system, using the first data and the third data, a third suitability level representing third indicia of how the second potential system will perform with the target system; and
    causing a second dynamic visual indicator representative of the second suitability level to be displayed on the display.

4. The method of claim 3, wherein each suitability level is indicated using the dynamic visual indicators as one of low risk, medium risk or high risk.

5. The method of claim 4, wherein the low risk is represented by a first color of the dynamic visual indicators, medium risk is represented by a second color of the dynamic visual indicators and high risk is represented by a third color of the dynamic visual indicators.

6. The method of claim 1, further comprising:
    using the comparison factor to determine the first suitability level for the first potential system; and
    using the comparison factor to determine the second indicia of performance for the first potential system.

7. A system comprising:
    one or more processors; and
    a non-transitory computer readable medium storing a plurality of instructions, which when executed, cause the one or more processors to:
    receive first data regarding a target system;
    receive second data regarding a first potential system;
    determine a comparison factor using a coolant distribution unit (CDU) efficiency from the second data and a quantity of heat transmitted by the target system determined from the first data;
    determine using the first data, the second data and the comparison factor, a first suitability level associated with using the first potential system with the target system, the first suitability level representing a first indicia of how the first potential system will perform with the target system; and
    cause a first dynamic visual indicator representative of the first suitability level to be displayed on a display.

8. The system of claim 7, wherein the plurality of instructions further cause the one or more processors to:
    determine, using the first data and the second data, a second suitability level representing a second indicia of how the first potential system will perform with the target system; and
    cause a second dynamic visual indicator representative of the second suitability level to be displayed on the display.

9. The system of claim 7, wherein the plurality of instructions further cause the one or more processors to:
    receive third data regarding a second potential system;
    determine for the second potential system, using the first data and the third data, a third suitability level representing third indicia of how the second potential system will perform with the target system; and
    cause a second dynamic visual indicator representative of the second suitability level to be displayed on the display.

10. The system of claim 9, wherein each suitability level is indicated using the dynamic visual indicators as one of low risk, medium risk or high risk.

11. The system of claim 10, wherein the low risk is represented by a first color of the dynamic visual indicators, medium risk is represented by a second color of the dynamic visual indicators and high risk is represented by a third color of the dynamic visual indicators.

12. The system of claim 7, wherein the plurality of instructions further cause the one or more processors to:
    use the comparison factor to determine the first suitability level for the first potential system; and
    use the comparison factor to determine the second indicia of performance for the first potential system.

13. A computer program product, comprising a non-transitory computer-readable medium having computer-readable program code embodied therein to be executed by one or more processors, the program code including instructions to:
    receive first data regarding a target system;
    receive second data regarding a first potential system;
    determine a comparison factor using a coolant distribution unit (CDU) efficiency from the second data and a quantity of heat transmitted by the target system determined from the first data;

determine using the first data, the second data and the comparison factor, a first suitability level associated with using the first potential system with the target system, the first suitability level representing a first indicia of how the first potential system will perform with the target system; and cause a first dynamic visual indicator representative of the first suitability level to be displayed on the display.

14. The computer program product of claim 13, wherein the program code includes further instructions to:

determine, using the first data and the second data, a second suitability level representing a second indicia of how the first potential system will perform with the target system; and cause a second dynamic visual indicator representative of the second suitability level to be displayed on the display.

15. The computer program product of claim 13, wherein the plurality of instructions further cause the one or more processors to:

receive third data regarding a second potential system;

determine for the second potential system, using the first data and the third data, a third suitability level representing third indicia of how the second potential system will perform with the target system; and cause a second dynamic visual indicator representative of the second suitability level to be displayed on the display.

16. The computer program product of claim 15, wherein each suitability level is indicated using the dynamic visual indicators as one of low risk, medium risk or high risk.

17. The computer program product of claim 16, wherein the low risk is represented by a first color of the dynamic visual indicators, medium risk is represented by a second color of the dynamic visual indicators and high risk is represented by a third color of the dynamic visual indicators.

18. The computer program product of claim 14, wherein the plurality of instructions further cause the one or more processors to use the comparison factor to determine the second indicia of performance for the first potential system.

\*   \*   \*   \*   \*